CROSS REFERENCE SEARCH ROOM

April 13, 1965 H. D. CRANE 3,178,582

WAVESHAPE RECOGNITION SYSTEM

Filed Nov. 10, 1961 2 Sheets-Sheet 1

INVENTOR.
HEWITT D. CRANE
BY Samuel E. Turner
ATTORNEY

April 13, 1965 H. D. CRANE 3,178,582

WAVESHAPE RECOGNITION SYSTEM

Filed Nov. 10, 1961 2 Sheets-Sheet 2

INVENTOR.
HEWITT D. CRANE
BY Samuel E. Turner
ATTORNEY

United States Patent Office 3,178,582

Patented Apr. 13, 1965

3,178,582

WAVESHAPE RECOGNITION SYSTEM

Hewitt D. Crane, Palo Alto, Calif., assignor to General Electric Company, a corporation of New York Filed Nov. 10, 1961, Ser. No. 151,493
16 Claims. (Cl. 307—88)

This invention relates to a system for recognizing each of a plurality of different electrical waveshapes. More specifically the invention relates to a simplified waveshape recognition system comprising a series of magnetic cores in which samples of portions of the waveshapes are stored and a readout circuit by which the waveshapes are identified from the stored samples.

The invention has particular utility in the field of reading human language symbols in systems wherein a distinctive electrical waveshape is produced for each symbol. For example, a United States Patent No. 2,924,812, issued February 9, 1960 to P. E. Merritt and C. M. Steele for an Automatic Reading System, which is assigned to the same assignee as the instant invention, describes and claims a system for automatically reading human language which is printed on documents as symbols in ink capable of being magnetized. As shown in that patent, the symbols are magnetized and translated in sequence past a reading transducer which generates a distinctive electrical waveshape for each symbol. This symbol representing waveshape is applied to a wave transmission means in the form of a delay line which is provided with a plurality of spaced symbol sampling taps for detecting voltages at corresponding points of the waveshape. For recognition of a waveshape there is provided a plurality of correlation circuits, one for each of the waveshapes to be recognized. Each of the correlation circuits is connected to the sampling taps through a respective waveshape correlation network. Each of the correlation circuits is thereby adapted to produce an output signal greater than that produced by any other of the correlation circuits when the corresponding waveshape is in a predetermined reference position in the delay line. A comparing circuit receives the correlation signals from the correlation circuits and is adapted to produce a signal on an output line corresponding to the correlation circuit which has the highest correlation signal.

The concept of correlation is fully described in the above-mentioned U.S. Patent No. 2,924,812. Briefly, the correlation circuit is the sum of amplitudes of signals at each of the sampling taps of the delay line each multiplied by the value of a predetermined correlation function. The predetermined correlation functions are related to the amplitudes of the signals at the sampling taps when an ideal waveshape corresponding to the correlation circuit is at the reference position in the delay line.

In the system disclosed in the above-mentioned U.S. Patent No. 2,924,812 each correlation circuit comprises a network of resistive dividers each connected to one of the sampling taps. Each of these resistive dividers embodies the predetermined function. The signals from the resistive dividers are summed to obtain the correlation signal. Because the symbol signal has both positive and negative portions it is necessary in such a system to separately sum the positive and negative signals from the resistive dividers. One of these partial sums is then inverted and added to the other to obtain the correlation signal. The correlation signal must also be normalized, that is, it must be reduced to a standard relative amplitude. This is accomplished by a resistive divider as is explained in the above-mentioned U.S. Patent No. 2,924,812.

Thus in waveshape recognition systems such as shown in the above-mentioned patent a correlation circuit having a large number of elements, many of them active, is required for each symbol to be recognized.

It is therefore an object of the invention to provide an improved waveshape recognition system.

Another object of the invention is to minimize the number of elements in a waveshape recognition circuit.

Another object of the invention is to minimize the number of active elements in a waveshape recognition circuit.

Another object of the invention is to store samples of portions of a waveshape in a series of magnetic cores.

Another object of the invention is to read out samples of portions of a waveshape stored in magnetic cores.

Another object of the invention is to combine samples of portions of a waveshape stored in magnetic cores.

Another object of the invention is to identify a waveshape by samples thereof stored in magnetic cores.

Another object of the invention is to steer a correlation current through a circuit corresponding to a waveshape, Another object of the invention is to provide a variable speed reading system.

These and other objects of the invention are achieved by providing an array of magnetizable storage cores in which respective samples of each waveshape received are stored. A signal winding links all of the cores by which a magnetizing force proportional to the instantaneous amplitude of the waveshape is applied to each core. A sampling pulse is applied to the cores in sequence. The sampling pulse biases each core in turn to a predetermined magnetic threshold and the waveshape signal reverses or switches an amount of flux in each core proportional to the concurrent waveshape signal amplitude.

A correlation circuit is provided which includes a plurality of windings, one for each of the waveshapes to be identified, each linking various ones of the cores with various numbers of turns as determined by the position and amplitude of the antinodes or other selected portions of the corresponding waveshape. A readout signal resets all of the cores simultaneously and the correlation winding corresponding to the stored waveshape delivers an output signal greater than that delivered by any other of the correlation windings.

Additionally a current steering circuit is provided which may be connected to the correlation windings so that only the winding generating the largest signal delivers an output signal.

The invention will be described in greater detail with reference to the accompanying drawings in which.

Figure 1:
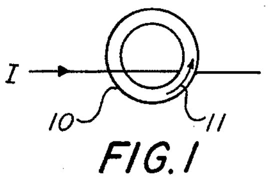
FIGURE 1 is a representation of a magnetic storage core as employed in the present invention.

In FIG. 1 there is shown a saturable magnetic storage core 10 as employed in the present invention. The properties of such cores are well-known and will not be discussed in detail here. Briefly, when a current of sufficient magnitude is passed through a winding on such a core the core will be magnetized in accordance with the direction of the resulting magnetomotive force, the magnetomotive force being proportional to the current and the number of turns of the winding. The core will remain at substantially the same state of magnetization when the magnetomotive force is removed until a magnetomotive force of greater magnitude in the same direciton (assuming nonsaturation) or a magnetomotive force of sufficient magnitude in the opposite direction is applied.

Figure 2:
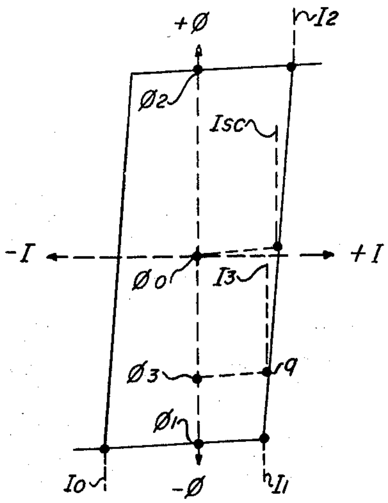
FIGURE 2 illustrates a hysteresis loop of the storage core of FIG. 1.

Assume for example that the core 10 of FIG. 1 is initially magnetized to saturation in the counterclockwise direction as indicated by the flux-representing arrow 11. If a current I is applied to a winding linking core 10 as shown then the resulting magnetomotive force is, by the right hand rule, in a direction to oppose the stored flux. FIG. 2 shows a hysteresis loop of a storage core such as core 10 of FIG. 1. As may be seen from this figure currents less than I1 cause substantially no switching or reversal of the flux stored in the core; however, a current equal to or greater than I2 will switch substantially all the flux in the core and bring it to saturation in a direction opposite the original direction of saturation. When the current I2 is removed a flux $\phi 2$ remains stored in the core.

Consider now a current I3 which is less than I2 but greater than I1. The current I3 magnetizes the core to a point $q$ on the hysteresis loop and when this current is removed an amount of flux $\phi 3$ remains stored in the core. It is noted that a subsequent current greater than I3 is required to switch additional flux in the core.

To reset the core a current I0, which is substantially the same magnitude as I2 but in the opposite direction, is applied.

Figure 3:
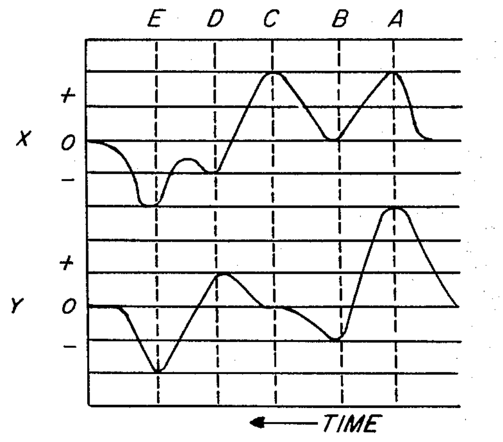
FIGURE 3 illustrates two waveshapes of a plurality of waveshapes which may be distinguished by the present invention.
Figure 4:
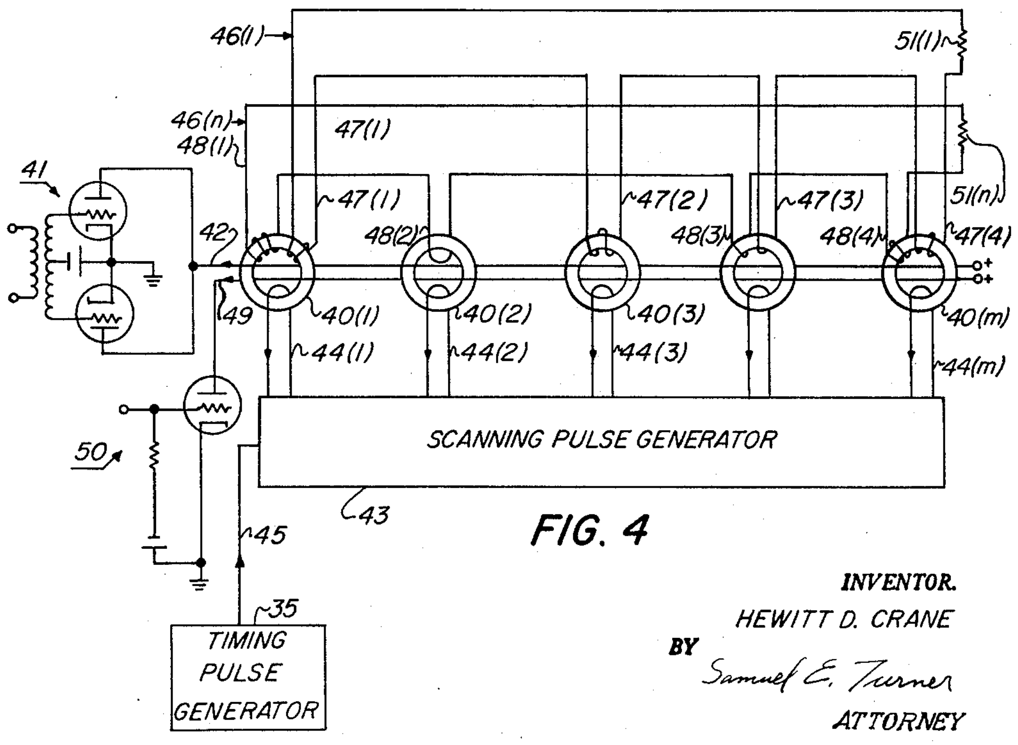
FIGURE 4 is a schematic diagram of a first embodiment of the invention.

With the above concepts in mind attention will be turned to FIG. 4 which is a schematic illustration of a first embodiment of a waveshape recognition system employing a series of storage cores for storing samples of predetermined portions of each of a plurality of waveshapes to be recognized. Reference is also made to FIG. 3 which illustrates a first waveshape X and a second waveshape Y which are representative of a plurality of waveshapes which may be distinguished by the present invention.

As previously mentioned the waveshapes are sampled at successive sample times corresponding to successive portions or sample zones of the waveshapes. As illustrated in FIG. 3 the waveshapes occur from right to left with respect to time, thus time is indicated as increasing to the left. A plurality of sample times A–E are also indicated in FIG. 3 with sample time A occurring first. For purposes of the present illustration the sample times have been chosen to coincide with the positions of possible nodes and antinodes of the waveshapes but this is not a limitation of the invention. As will become evident, any chosen portion of a waveshape may be sampled.

Turning now to FIG. 4, there is shown a series of storage cores 40($l$)–40($m$) corresponding respectively to the sample times A–E. It is arranged that each storage core stores an amount of flux proportional to the amplitude of the waveshape being sampled at the corresponding sample time. This is accomplished as follows. The waveshape signal is applied to the input terminals of an inverter-driver 41. The inverter-driver is connected to a signal winding 42 which links all of the cores. The inverter-driver is arranged to drive a current proportional to the amplitude of both positive and negative portions of the waveshape to the left through the signal winding 42 as indicated. Thus the magnetomotive force due to the signal current is in the the same direction (counterclockwise) for each of the storage cores for both positive and negative portions of the waveshape.

To establish the successive sample times there is provided a scanning pulse generator 43 for applying a scanning pulse to each of the storage cores in sequence. Scanning current pulses are produced by the generator 43 in a sequence corresponding to the respective sample times A–E on a plurality of separate windings 44($l$)–44($m$) which link respective ones of the storage cores. (Suitable generators for producing sequential pulses on separate lines are well-known and scanning pulse generator 43 may be of the current-steering commutator type as shown by J. A. Rajchman and H. D. Crane in IRE Transactions on Electronic Computers, volume EC6, No. 1, March 1957, page 26.)

A timing pulse generator 35 is provided for actuating the scanning pulse generator over a lead 45 at each successive sample time. Timing pulse generator 35 may be any well-known pulse source such as an oscillator with suitable pulse forming circuits. To time the actuation of the scanning pulse generator 43 with the occurrence of a waveshape to be sampled the frequency of operation of the timing pulse generator 35 is adjusted with relation to the speed of reading symbols from the document. The system can thus be adjusted for various reading speeds.

As in the case of the signal current, the scanning current is in a direction as indicated such that it applies a magnetomotive force in the counterclockwise direction to the cores. In this first embodiment of the invention it is arranged that neither the maximum signal current on lead 42 nor the scanning current from generator 43 is sufficient alone to switch substantial flux in the storage cores. More specifically the signal current is never more than I1 (FIG. 2) and the scanning current is adjusted to be substantially equal to I1. Thus it may be seen that the combined effect of the simultaneous occurrence of a signal current and a sample current pulse is equivalent to a current greater than I1 by an amount proportional to the signal current and therefore an amount of flux proportional to the signal current is switched.

How the embodiment of FIG. 4 stores and recognizes a waveshape, for example the waveshape X of FIG. 3, will now be detailed. Assume that the cores 40($l$)–40($m$) are initially saturated in the clockwise direction and that the waveshape X is applied to the inverter-driver 41. At the sample time A the scanning pulse generator 43 applies a scanning current pulse to the winding 44(1) of storage core 40(1). As may be seen from FIG. 3 a positive portion of the waveshape X occurs at the sample time A. This waveshape signal causes a corresponding current flow in the signal winding 42. The simultaneous occurrence of the scanning current pulse on winding 44(1) and the signal current on winding 42 causes an amount of flux proportional to the amplitude of the waveshape signal at sample time A to be reversed or switched in core 40(1).

At the sample time B the scanning pulse generator 43 applies a scanning current pulse to winding 44(2) of storage core 40(2). However, a node of waveshape X occurs at the sample time B. Thus there is substantially no signal current produced on the signal winding 42. Consequently substantially no flux is switched in the storage core 40(2) upon sampling the waveshape X at sample time B.

The remaining storage cores are sequentially switched in a manner similar to core 40(1) as described above to store amounts of flux proportional to the amplitudes of waveshape X at the sample times C, D and E.

Once the samples of the waveshape X have been stored in the storage cores it is then desired to provide a manifestation of the identity of the waveshape. This is accomplished, as previously mentioned, by providing a plurality of correlation circuits 46($l$)–46($n$), one for each of the waveshapes to be recognized. The identity of a waveshape is manifested by the fact that the highest signal is produced by the correlation circuit corresponding to the sampled waveshape when the storage cores are reset to their initial state.

Each correlation circuit includes a plurality of correlation windings connected in series with one another and with a load resistor across which the output waveshape signal of each correlation circuit is developed. Correlation circuit 46(1), for example, which corresponds to the waveshape X of FIG. 3, includes a plurality of correlation windings 47(1)–47(4) corresponding respectively to the sample times A, C, D and E. It is noted that the correlation circuit 46(1) does not include a correlation winding on the storage core 40(2) because, as illustrated, the waveshape X is at a node at the sample time B and substantially no flux is switched in the core 40(2). The correlation circuit 46(1) also includes a load resistor 51(1).

Similarly, the correlation circuit 46($n$) includes a plurality of correlation windings 48(1)–48(4) and a load resistor 51($n$). Correlation circuit 46($n$) is illustrated as corresponding to the waveshape Y of FIG. 3.

The number of turns of each correlation winding is adjusted according to a predetermined correlation function. The theory of correlation is discussed in the previously mentioned U.S. Patent No. 2,924,812. In general the correlation function is related to the relative amplitudes of the sampled portions of the waveshape. For purposes of illustration the number of turns of each correlation winding of FIG. 4 is shown equal to the relative amplitude of the corresponding portion of the related waveshape. In FIG. 3 the horizontal lines indicates units of amplitude. Thus the amplitude of the waveshape X at the sample time A is two units. Therefore the corresponding correlation winding 47(1) is formed with two turns. The waveshape is of substantially zero amplitude at the sample time B, therefore, no correlation winding for the waveshape X correlation circuit 46(1) is provided on the related core 40(2). The waveshape X again has an amplitude of two units at the sample time C and accordingly the correlation winding 47(2) is formed with two turns. The one turn winding 47(3) corresponds to the one unit amplitude of the waveshape X at the sample time D and the two turn winding 47(4) corresponds to the two unit amplitude of the waveshape at the sample time E. The number of turns of the correlation windings 48(1)–48(4) are similarly chosen in accordance with the amplitudes of the sampled portion of the waveshape Y.

To produce signals in the correlation circuits the storage cores are reset to their initial state. To do this there is provided a reset winding 49 which links all of the cores. This reset winding is connected to a reset driver circuit 50 which is responsive to a suitable signal at its input terminal to cause a current flow corresponding to I0 of FIG. 2 in the leftward direction through winding 49 thus resetting the cores to their initial state of saturation in the clockwise direction. The resulting change in flux in the storage cores causes voltages to be developed by the correlation windings and across the respective load resistors.

The highest output waveshape signal appears across the load resistor of the correlation circuit corresponding to the sampled waveshape. This may be seen by considering that the output waveshape signal voltage across a given load resistor is proportional to the summation of the amounts of flux stored in the cores times the number of turns of the respective correlation windings of the corresponding correlation circuit. The amount of flux stored in each core is in turn proportional to the amplitude of the waveshape signal during the corresponding sample period. Thus the output waveshape signal is proportional to the summation of the amplitudes of the waveshape signal during successive sample periods times the number of turns of the respective correlation windings. Thus if the waveshape X is sampled the output waveshape signal across load resistor 51(1) is proportional to $2\times2$, the relative amplitude of waveshape X at the sample time A times the number of turns of correlation winding 47(1), $+0\times0+2\times2+1\times1+2\times2=13$. The output waveshape signal across load resistor 51(1) when a waveshape X is sampled is proportional to $$2\times3+0\times1+2\times0+1\times1+2\times2=11$$

If a waveshape Y is sampled the output waveshape signal across the corresponding load resistor 51(n) is proportional to $3\times3+1\times1+0\times0+1\times1+2\times2=15$ and the signal across load resistor 51(1) is then $$3\times2+1\times0+0\times2+1\times1+2\times2=11$$

Thus it is seen that the highest output waveshape signal is produced across the load resistor of the correlation circuit corresponding to the sampled waveshape.

In the foregoing illustration of the operation of the correlation circuits the correlation function is taken as unity, that is, as previously mentioned, the number of turns of each correlation winding is shown equal to the relative amplitude of the corresponding portion of the related waveshape. However this is not a limitation of the invention and other correlation functions may be used. For example it may be advantageous to adjust the number of turns of the correlation windings according to the squares of the relative amplitudes of sampled portions of the waveshape. What the foregoing discussion illustrates is that the turns of the correlation windings can be adjusted according to the relative amplitudes of sampled portions of a waveshape whereby each of a plurality of different waveshapes may be recognized.

It will be appreciated that in a general system of symbols the energy content of the waveshapes thereof will ordinarily not be the same. In this event normalization among the waveshapes to be recognized will be necessary in order that waveshapes with small energy content will not produce erroneous output signals from noncorresponding correlation circuits. The technique of normalizing is fully discussed in the above-mentioned U.S. Patent No. 2,924,812. In the present circuits normalizing may be accomplished by adjusting the total number of turns of each correlation circuit relative to the other correlation circuits.

It may be desirable to produce an output signal on only one of a plurality of respective waveshape output signal lines. For this purpose an amplitude sensing apparatus (not shown herein but shown in the above-mentioned U.S. Patent No. 2,924,812) may be employed with the circuit of FIG. 4 to detect the highest voltage on the load resistors 51(1)–51($n$). Alternatively, the correlation circuits of the embodiment shown in FIG. 4 may be connected in a current steering arrangement as will be described hereinafter with the description of the second illustrated embodiment of the invention.

Figures 5, 6:
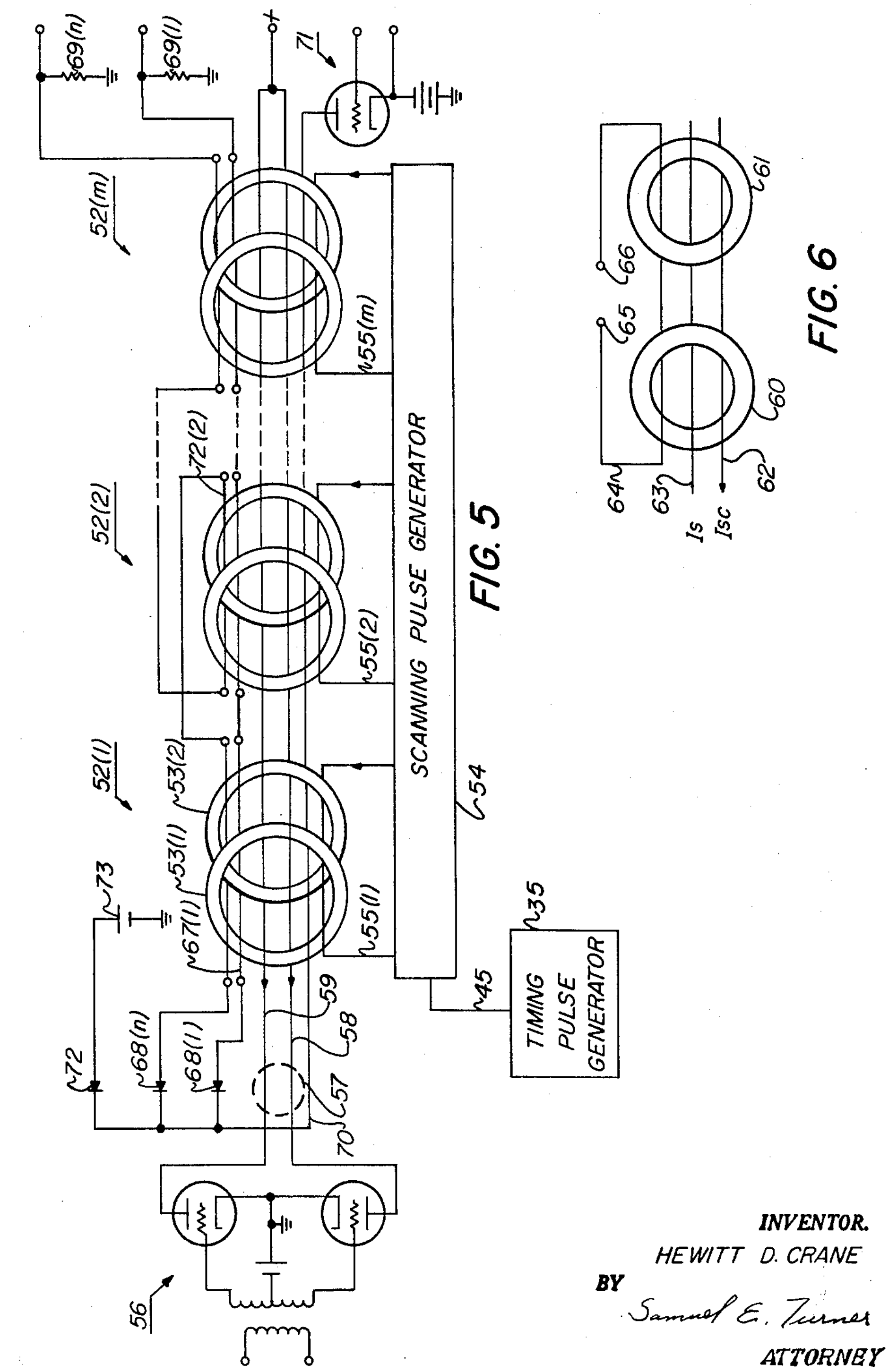
FIGURE 5 is a schematic diagram of a second embodiment of the invention.
FIGURE 6 is a schematic diagram of a core set useful in the preliminary explanation of the principles of operation of the second embodiment of the invention.

A second embodiment of the invention is schematically illustrated in FIG. 5. In this embodiment a plurality of core sets 52(1)–52($m$) are provided for storing amounts of flux proportional to the amplitudes of sampled portions of a waveshape. Each core set comprises a pair of cores such as cores 53(1) and 53(2) of core set 52(1). It is arranged that the waveshape signal current aids the scanning current as to one core of the set and opposes the scanning current as to the other core of the set with the result that the difference in the amount of flux stored in the cores is proportional to the amplitude of the waveshape signal sample. Reference will now be made to FIG. 6 for an illustration of the basic manner of operation of a core set in the second embodiment of the invention.

In FIG. 6 there is shown a core set comprising cores 60 and 61. A scanning winding 62 links both of the cores in the same direction. A signal winding 63 links the cores in opposite directions and an output winding 64 also links the cores in opposite directions. In this embodiment of the invention the scanning current is adjusted to switch the flux in the cores to the midpoint of the hysteresis loop whereat the total net flux in the core is substantially zero. Thus the scanning current of the second embodiment of the invention corresponds to a current 1$sc$ in FIG. 2.

In this second embodiment, waveshape signals may be either positive or negative, thus signal currents flow in the signal winding 63 in either direction. Suppose, for example, that a waveshape signal causes a signal current $I_s$ to flow in the signal winding 63 in the leftward direction at a time when the scanning current $I_{sc}$ is applied. Under these conditions the signal current produces a magnetomotive force in the counterclockwise direction as to the core 60. This is in the same direction as the magnetomotive force produced by the scanning current. Thus the amount of flux switched in the core 60 is above the midpoint of the hysteresis loop by an amount proportional to the signal current. On the other hand, a signal current in the signal winding 63 in the leftward direction opposes the effect of the scanning current $I_{sc}$ as to the core 61 because the signal winding 63 links the core 61 in the opposite direction. Therefore, the amount of flux switched in the core 61 in response to the scanning current and a leftward signal current is below the midpoint of the hysteresis loop by an amount proportional to the signal current. Thus the difference in the amounts of flux switched in the cores 60 and 61 is proportional to the signal current and therefore proportional to the amplitude of the waveshape at the corresponding sample time.

It is noted that if the waveshape signal is of a polarity to cause a signal current flow in the signal winding 63 in the rightward direction the effect on the cores is reversed and the flux in core 60 is then switched to a point below the midpoint of the hysteresis loop and the flux in the core 61 to a point above. In either case after a waveshape sample is stored in the cores and the cores are then reset to their original state of saturation the resultant flux change causes a signal in the output winding 64.

Since the output winding 64 links the cores in opposite directions the amplitude of the output signal produced at a pair of terminals 65 and 66 is proportional to the difference in the amount of flux switched in the cores 60 and 61 upon their being reset. It is also noted that the polarity of the signal at terminals 65 and 66 depends upon the direction of the stored flux which in turn depends upon the polarity of the waveshape signal. With the above manner of operation of a core set in mind attention is again directed to the circuit of the second embodiment of the invention shown in FIG. 5.

As shown in FIG. 5 a scanning pulse generator 54, which is similar to the generator 43 of FIG. 4, applies scanning current pulses to the core sets 52(1)–**52(*m*) in sequence over a plurality of scanning windings 55(1)–55(*m*) at successive sample times as explained above in the description of the embodiment of FIG. 4. The scanning current pulses from the generator 54** are of a magnitude to switch the normally clockwise flux in the cores to the midpoint of the hysteresis loop as explained above in connection with FIG. 6.

Waveshape signals are received at the input of a push-pull driver circuit 56. In response to waveshape signals the driver circuit produces current flow in a signal winding 57 comprised of a pair of lines 58 and 59. These lines link the cores in opposite directions whereby the effect of the D.C. component of the signal currents is eliminated in the case that the driver 56 is operated so that quiescent currents are present. As explained in the above discussion of FIG. 6 the signal winding links the cores of a core set in opposite directions so that a current through the signal winding produces a magnetomotive force in opposite directions as to the cores of a set. Thus assume, for example, that at a first sample time the waveshape signal is positive. Further assume that a positive waveshape signal applied to the driver 56 produces an increase of current through line 59 and a corresponding decrease in current through line 58. At such a first sample time the scanning pulse generator 54 applies a scanning current pulse through the scanning winding 55(1). The scanning current and the signal currents in lines 58 and 59 result in a magnetomotive force in the counterclockwise direction as to the core 53(1).

Therefore the flux in the core 53(1) is switched to a point above the midpoint of its hysteresis loop. On the other hand, the signal currents in lines 58 and 59 result in a magnetomotive force which opposes the effect of the scanning current as to the core 53(2) and the flux therein is therefore switched to a point below the midpoint of its hysteresis loop. In this manner a sample of a positive portion of a waveshape is stored.

A negative waveshape signal results in an increase in the current through line 58 and a corresponding decrease in current through line 59 of the signal winding 57. Thus the circuit of FIG. 5 can receive and store samples of waveshapes, such as shown in FIG. 3, as differences in the amounts of flux switched in the cores of the core sets.

To read out the stored samples of a waveshape and to provide a manifestation of its identity there is provided in the circuit of FIG. 5 a plurality of correlation circuits, one for each of the waveshapes to be recognized, connected in a current steering arrangement. When the cores are reset to their initial state the resulting flux changes cause the highest voltage to be produced in the correlation circuit corresponding to the sampled waveshape as explained hereinbefore in the discussion of the first embodiment. In this second embodiment this voltage steers a current through the correlation circuit in which it is developed to the exclusion of currents in the other correlation circuits. By this structure the identity of the waveshape is manifested as a signal across only one of a plurality of load resistors without the necessity of further detection for the maximum among several signals or the like.

Each correlation circuit includes a plurality of series connected correlation windings which link the cores of a core set in opposite directions so that when the cores are reset the voltage produced on the correlation winding is proportional to the difference in the amounts of flux stored in the cores. For example, a correlation winding 67(1) links the core set 52(1). To account for the polarity of a stored sample of a waveshape the correlation winding is linked through the corresponding core set accordingly. For example where a sample of a negative portion of a waveshape is stored the correlation winding is connected with opposite polarity in the correlation circuit so that the voltages developed in the correlation circuit are summed. For example, a correlation winding 72(2), linking the core set 52(2), is shown in FIG. 5 as connected in its correlation circuit with reversed polarity.

For convenience of illustration the correlation windings of FIG. 5 are shown as linking the cores with a single turn. However, it is to be understood that each correlation winding links each core set with a number of turns in accordance with a predetermined correlation function and to achieve the required normalizing as discussed hereinbefore in connection with the first embodiment shown in FIG. 4.

In addition to its correlation windings each correlation circuit includes a respective one of a plurality of unidirectional conductors shown as steering diodes 68(1)–**68(*n*) and a respective one of a plurality of load resistors 69(1)–69(*n*)** across which the output waveshape signal is developed when the cores are reset.

To reset the cores to their initial state of saturation the cores are linked with a reset winding 70 which is connected at one end to a reset driver circuit 71 and at its other end to the steering diodes 68(1)–**68(*n*). By these connections the reset current not only performs the reset function but it also constitutes the correlation current which is steered through the correlation circuits. It should be mentioned however that a separate current source could be used to provide the correlation current. It should also be mentioned at this point that for convenience of illustration the reset winding 70** is shown as linking the cores with a single turn whereas in general a plurality of turns is required to provide the requisite magnetomotive force to reset the cores to their initial state of saturation and to offset the effects of opposing currents which in some instances will flow in the correlation circuits during the reset action.

The reset driver circuit 71 is an example of a controllable current source which when turned on causes a current flow to the right in the reset winding 70. A current must flow in the reset winding and begin to switch the flux in the cores in order to develop correlation voltages across the correlation circuits, the highest voltage of which can then steer the current. It is desirable to prevent unsteered currents in the correlation circuits during the initial part of the reset cycle to thereby prevent spurious signals across the load resistors 69(1)–69($n$). To accomplish this there is provided a steering bias circuit comprising a diode 72 and a potential source 73. The potential source 73 acts through the diode 72 to back bias the diodes 68(1)–68($n$) and to thus prevent the initial reset current from flowing in the correlation circuits. The reset current flows through the steering bias circuit until a correlation voltage is developed across one of the correlation circuits which is higher than that of the potential source 73. This correlation voltage then back biases the diodes of the other correlation circuits and also diode 72 and thus the reset current is steered through the correlation circuit which develops the highest correlation voltage which correlation circuit, as explained hereinbefore, corresponds to the sampled waveshape. A voltage is therefore produced across only the related load resistor to manifest the identity of the waveshape. It is noted that in addition to performing the steering function the steering diodes 68(1)–68($n$), by virtue of the back-to-back connection thereof, prevent undesirable current flow in the correlation circuits during sampling of the waveshape. The steering arrangement just described may of course also be employed with other embodiments of the invention.

While the principles of the invention have been made clear in the illustrative embodiments, there will be obvious to those skilled in the art, many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications within the limits only of the true spirit and scope of the invention.

What is claimed is:

1. Apparatus for storing samples of successive portions of waveshape signals comprising: a series of magnetic storage cores one for each of the successive portions of the waveshape signal to be sampled; a waveshape signal winding linking all of said cores; a plurality of separate scanning windings each linking a respective one of said cores; means for switching the magnetic flux in said cores to a predetermined initial state; means for applying a waveshape signal to said waveshape signal winding; and means for applying a scanning current pulse to each of said scanning windings in sequence and in coincidence with the occurrence on said waveshape signal winding of a corresponding successive portion of said waveshape signal for switching an amount of flux in each core in proportion to the amplitude of said corresponding portion of the waveshape signal.

2. Apparatus for storing samples of successive portions of waveshape signals comprising: a plurality of magnetic storage cores arranged in a series of core sets, one core set for each of the portions of the waveshape to be sampled; a waveshape signal winding linking all of said cores; a plurality of separate scanning windings each linking the cores of a respective one of said core sets; means for switching the magnetic flux in said cores to a predetermined initial state; means for applying a waveshape signal to said waveshape signal winding; and means for applying a scanning current pulse to each of said scanning windings in sequence and in coincidence with the occurrence on said signal winding of each corresponding successive portion of said waveshape signal for switching the flux in the cores of each of said sets in proportion to the amplitude of said corresponding portion of the waveshape signal.

3. A waveshape recognition system comprising: a series of magnetic storage cores for storing samples of successive portions of waveshapes to be recognized; a waveshape signal winding linking all of said cores; driver means for receiving a waveshape and for producing currents in said signal winding proportional to the amplitudes of said waveshape; a plurality of separate scanning windings each linking a respective one of said cores; a scanning pulse generator for applying a scanning current pulse to each of said scanning windings in sequence and in coincidence respectively with the receipt by said driver means of said successive portions of a waveshape for switching an amount of magnetic flux in each core in proportion to the amplitude of the corresponding portion of the waveshape; a reset winding linking all of said cores; a reset driver circuit for producing a current in said reset winding for resetting said cores to a predetermined initial state; a plurality of correlation circuits one for each of the waveshapes to be recognized, each correlation circuit comprising a series of correlation windings on said cores, the number of turns of each correlation winding being determined by a predetermined correlation function related to the amplitude of the sample of the waveshape to be stored by the core whereby the highest amplitude signal is produced by the correlation circuit corresponding to the sampled waveshape upon resetting the storage cores.

4. Apparatus for identifying each of a plurality of different waveshapes comprising: a series of magnetic storage core sets for storing magnetic flux representations of the amplitudes of successive portions of waveshapes to be identified; a waveshape signal winding linking all of said cores; driver means for receiving a waveshape and for producing currents in said signal winding proportional to the amplitudes of said waveshape, a plurality of separate scanning windings each linking the cores of a respective one of said core sets; a scanning pulse generator for applying a scanning current pulse to each of said scanning windings in sequence and in coincidence with the receipt by said driver means of a respectively corresponding one of said successive portions of a waveshape for switching the flux in the cores of each said core sets whereby the difference in the amount of flux switched in the cores of a core set is proportional to the amplitude of the corresponding portion of the waveshape; a reset winding linking all of said cores; a reset driver circuit for producing a current in said reset winding for switching the flux in said cores to a predetermined state; a plurality of correlation circuits one for each of the waveshapes to be identified, each correlation circuit comprising a series of correlation windings linking said core sets, the number of turns of each correlation winding being determined by a predetermined correlation function related to the amplitude of the portion of the waveshape to be stored by the core set whereby the highest amplitude signal is produced by the correlation circuit corresponding to the sampled waveshape upon resetting said cores.

5. Apparatus for identifying each of a plurality of different waveshapes comprising: a series of magnetic storage core sets for storing magnetic flux representations of the amplitudes of successive portions of waveshapes to be identified; a signal winding linking all of said cores; driver means for receiving a waveshape and for producing currents in said signal winding proportional to the amplitudes of said waveshape; a plurality of separate scanning windings each linking the cores of a respective one of said core sets; a scanning pulse generator for applying a scanning current pulse to each of said scanning windings in sequence and in coincidence with the receipt by said driver means of a respectively corresponding one of said successive portions of a waveshape for switching the flux in the cores of each said core sets whereby the difference in the amount of flux switched in the cores of a core set is proportional to the amplitude of the corresponding portion of the waveshape; a reset winding linking all of said cores; a reset driver circuit for producing a current in said reset winding for switching the flux in said cores to a predetermined state; a plurality of correlation circuits one for each of the waveshapes to be identified, each correlation circuit comprising a series of correlation windings linking said core sets, the number of turns of each correlation winding being determined by a predetermined correlation function related to the amplitude of the portion of the waveshape to be stored by the core set whereby the highest amplitude signal is produced by the correlation circuit corresponding to the sampled waveshape upon resetting said cores; and a current steering arrangement comprising a current source, and a plurality of diodes each connected at one end to a respective one of said correlation circuits and at its other end to said current source for steering current from said source through the correlation circuit producing said highest amplitude signal.

6. Apparatus for identifying each of a plurality of different waveshapes comprising: a series of magnetic storage core sets for storing magnetic flux representations of the amplitudes of successive portions of waveshapes to be identified; a waveshape signal winding linking all of said cores; driver means for receiving a waveshape and for producing currents in said signal winding proportional to the amplitudes of said waveshape; a plurality of separate scanning windings each linking the cores of a respective one of said core sets; a scanning pulse generator for applying a scanning current pulse to each of said scanning windings in sequence and in coincidence with the receipt by said driver means of a respectively corresponding one of said successive portions of a waveshape for switching the flux in the cores of each of said core sets whereby the difference in the amount of flux switched in the cores of a core set is proportional to the amplitude of the corresponding portion of the waveshape; a reset winding linking all of said cores; a reset driver circuit for producing a current in said reset winding for switching the flux in said cores to a predetermined state; a plurality of correlation circuits one for each of the waveshapes to be identified, each correlation circuit comprising a series of correlation windings linking said core sets, the number of turns of each correlation winding being determined by a predetermined correlation function related to the amplitude of the portion of the waveshape to be stored by the core set and the polarity of the connection of the winding in its correlation circuit being determined by the polarity of the portion of the waveshape to be stored by the core set.

7. Apparatus for storing samples of portions of waveshapes comprising: a series of magnetic storage cores, one core for each of the portions of the waveshape to be sampled, scanning means for applying a predetermined magnetomotive force to said cores in sequence and in timed relation to the occurrence of said waveshape; and means for applying a magnetomotive force proportional to the instantaneous amplitude of said waveshape to all of said cores simultaneously.

8. Apparatus for storing samples of portions of waveshapes comprising: a plurality of magnetic storage cores arranged in a series of core sets, each core set corresponding to a portion of the waveshape to be sampled; scanning means for applying a predetermined magnetomotive force to the cores of each core set in sequence and in timed relation to the occurrence of said waveshape; and means for applying a magnetomotive force proportional to the instantaneous amplitude of the waveshape to be sampled to all of said cores simultaneously.

9. Apparatus for storing samples of portions of waveshapes comprising: a series of waveshape sample storage means each corresponding to one of said portions and each comprising at least one magnetic storage core; scanning means for applying a predetermined magnetomotive force to the cores of each storage means in sequence and in time relation to the occurrence of a waveshape; and means for applying a magnetomotive force proportional to the instantaneous amplitude of the waveshape to be sampled to the cores of all of said storage means simultaneously.

10. Apparatus for storing samples of portions of waveshapes comprising: a series of waveshape sample storage means each corresponding to one of said portions and each comprising at least one magnetic storage core; means for applying a magnetomotive force proportional to the instantaneous amplitude of a waveshape to be sampled to the cores of all of said storage means; a scanning circuit for applying a predetermined magnetomotive force to the cores of each storage means in succession; and timing means for controlling the successive application of said magnetomotive force by said scanning circuit in timed relation to the occurrence of a waveshape to be sampled.

11. In a system for reading symbols on documents wherein characteristic waveshapes are produced in response to movement of the document relative to a transducer, apparatus for storing samples of successive portions of said waveshapes comprising: a series of waveshape sample storage means each corresponding to one of said portions of the waveshapes to be sampled and each comprising at least one magnetic storage core; means for applying a magnetomotive force proportional to the instantaneous amplitude of a waveshape to be sampled to the cores of all of said storage means simultaneously, a scanning circuit for applying a predetermined magnetomotive force to the cores of each storage means in sequence; and timing means for controlling the operation of said scanning means whereby said scanning circuit applies said magnetomotive force to the cores of each storage means in timed relation to the occurrence of said successive portions of waveshapes.

12. Apparatus for storing samples of portions of waveshapes taken at successive sample times comprising: a series of waveshape sample storage means one for each of said sample times and each comprising at least one magnetic storage core; scanning means for applying a predetermined magnetomotive force to the cores of each storage means in succession at corresponding successive sample times; and means for applying a magnetomotive force proportional to the instantaneous amplitude of the waveshape to be sampled to all of said cores simultaneously.

13. Apparatus for storing samples of portions of waveshapes taken at successive sample times comprising: a series of waveshape sample storage means one for each of said sample times and each comprising at least one magnetic storage core; and means for applying in coincidence a scanning magnetomotive force and a waveshape magnetomotive force proportional to the instantaneous amplitude of the sampled waveshape to the cores of each of said storage means in succession at corresponding successive sample times for storing in the cores of successive storage means amounts of flux proportional to the amplitude of the waveshape at corresponding successive sample times.

14. A waveshape recognition system comprising: a series of waveshape sample storage means for storing samples of portions of a waveshape to be recognized and each said storage means comprising at least one magnetic storage core; means for switching the flux in the cores of each storage means in proportion to the amplitude of the corresponding portion of said waveshape; a reset circuit for switching the flux in the cores of said storage means to a predetermined state; and a plurality of correlation circuits, one for each of the waveshapes to be recognized, each correlation circuit comprising a series of correlation windings each linking the cores of a corresponding storage means, the number of turns of each correlation winding being determined by a predetermined correlation function proportional to the amplitude of the portion of the waveshape to be stored by said corresponding storage means whereby the highest amplitude signal is produced by the correlation circuit corresponding to the sampled waveshape upon the resetting of the cores of all of said storage means by said reset circuit.

15. A waveshape recognition system comprising: a series of waveshape sample storage means for storing samples of portions of a waveshape to be recognized and each said storage means comprising at least one magnetic storage core; means for switching the flux in the cores of each storage means in proportion to the amplitude of the corresponding portion of said waveshape; a reset circuit for switching the flux in the cores of said storage means to a predetermined state; a plurality of correlation circuits, one for each of the waveshapes to be recognized, each correlation circuit comprising a series of correlation windings each linking the cores of a corresponding storage means, the number of turns of each correlation winding being determined by a predetermined correlation function proportional to the amplitude of the portion of the waveshape to be stored by said corresponding storage means whereby the highest amplitude signal is produced by the correlation circuit corresponding to the sampled waveshape upon the resetting of the cores of all of said storage means by said reset circuit; a current source; and a plurality of unidirectional conductors connecting respective ones of said correlation circuits to said current source for steering current from said source through the correlation circuit producing said highest amplitude signal.

16. A waveshape recognition system comprising: a series of waveshape sample storage means for storing samples of portions of a waveshape to be recognized and each said storage means comprising at least one magnetic storage core; means for switching the flux in the cores of each storage means in proportion to the amplitude of the corresponding portion of said waveshape; a reset circuit for switching the flux in the cores of said storage means to a predetermined state; and a plurality of correlation circuits, one for each of the waveshapes to be recognized, each correlation circuit comprising a series of correlation windings each linking the cores of a corresponding storage means, the number of turns of each correlation winding being determined by a predetermined correlation function proportional to the amplitude of the portion of the waveshape to be stored by said corresponding storage means whereby the highest amplitude signal is produced by the correlation circuit corresponding to the sampled waveshape upon the resetting of the cores of all of said storage means by said reset circuit; a current source; a plurality of unidirectional conductors connecting respective ones of said correlation circuits to said current source for steering current from said source through the correlation circuit producing said highest amplitude signal; a bias source; and an additional unidirectional conductor connected between said current source and said bias source for preventing current flow through said correlation circuits until said highest amplitude signal exceeds the potential of said bias source.

References Cited by the Examiner

UNITED STATES PATENTS

| | | | |
|---|---|---|---|
| 2,704,842 | 3/55 | Goodell et al. | 340—174 |
| 2,921,136 | 1/60 | Cooke | 340—174 |
| 2,947,971 | 8/60 | Glauberman et al. | 340—347 |
| 2,962,704 | 11/60 | Buser | 340—347 |
| 3,030,618 | 4/62 | Nilsson | 340—347 |
| 3,051,941 | 8/62 | Mallery | 340—347 |
| 3,068,462 | 12/62 | Medoff | 340—174 |
| 3,079,598 | 2/63 | Wald | 340—347 |

MALCOLM A. MORRISON, *Primary Examiner.*